(12) United States Patent
Bradford, III et al.

(10) Patent No.: US 10,588,460 B1
(45) Date of Patent: Mar. 17, 2020

(54) CERAMIC GRILL SHIELD

(71) Applicants: Lawrence James Bradford, III, Soddy Daisy, TN (US); Robin F. Bradford, Soddy Daisy, TN (US)

(72) Inventors: Lawrence James Bradford, III, Soddy Daisy, TN (US); Robin F. Bradford, Soddy Daisy, TN (US)

( * ) Notice: Subject to any disclaimer, the term of this patent is extended or adjusted under 35 U.S.C. 154(b) by 409 days.

(21) Appl. No.: 15/682,720

(22) Filed: Aug. 22, 2017

Related U.S. Application Data

(60) Provisional application No. 62/379,837, filed on Aug. 26, 2016.

(51) Int. Cl.
| | |
|---|---|
| A47J 43/00 | (2006.01) |
| F24C 15/10 | (2006.01) |
| A47J 37/07 | (2006.01) |
| A47J 36/06 | (2006.01) |
| A47J 36/36 | (2006.01) |
| F24C 15/08 | (2006.01) |
| F24C 15/04 | (2006.01) |

(52) U.S. Cl.
CPC .......... *A47J 37/0786* (2013.01); *A47J 36/06* (2013.01); *A47J 36/36* (2013.01)

(58) Field of Classification Search
CPC ............ A47J 37/064107; A47J 37/0704; A47J 37/0713; A47J 37/0718; A47J 37/0727; A47J 37/0754; A47J 37/0759; A47J 37/0763; A47J 37/0786; A47J 36/06; A47J 36/36
USPC ............ 99/645; 126/15 R, 25 R, 37 A, 37 R, 126/39 B, 39 K, 41 R, 152 B, 198, 194
See application file for complete search history.

(56) References Cited

U.S. PATENT DOCUMENTS

| | | | |
|---|---|---|---|
| 2013/0008427 A1* | 1/2013 | Ahmed .................... | A47J 36/06 126/25 R |
| 2013/0228161 A1* | 9/2013 | Ahmed ............... | A47J 37/0727 126/25 R |
| 2016/0174767 A1* | 6/2016 | Schlosser ............ | A47J 37/0704 126/25 R |

* cited by examiner

*Primary Examiner* — Hung D Nguyen
(74) *Attorney, Agent, or Firm* — Stephen J. Stark; Miller & Martin PLLC

(57) ABSTRACT

A grill shield is provided for use with grills, some may be Kamado style grills. The shield can be provided in upper and lower shield portions which respectively connect to the top and the bottom of the grill. The shield portion(s) can connect with brackets to provide an air gap about the exterior surface of the grill and the shield thereby permitting the shield to be at a lower temperature than an exterior surface of the grill.

19 Claims, 3 Drawing Sheets

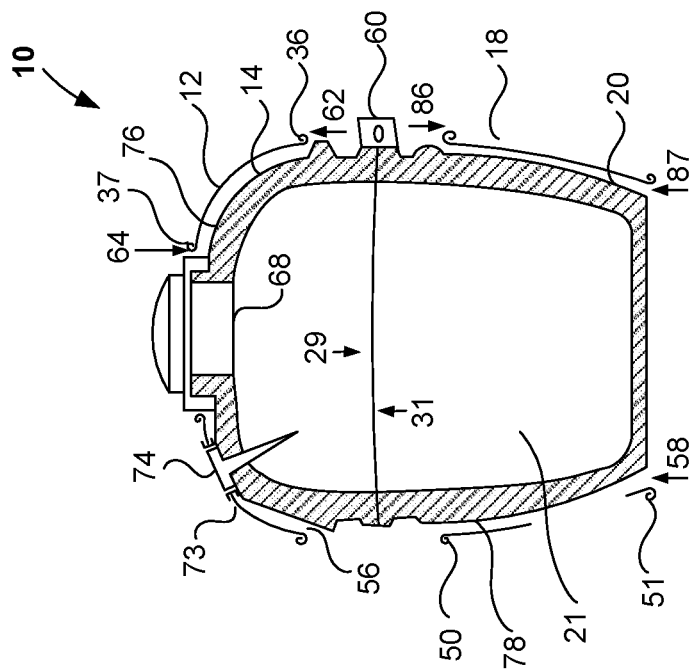
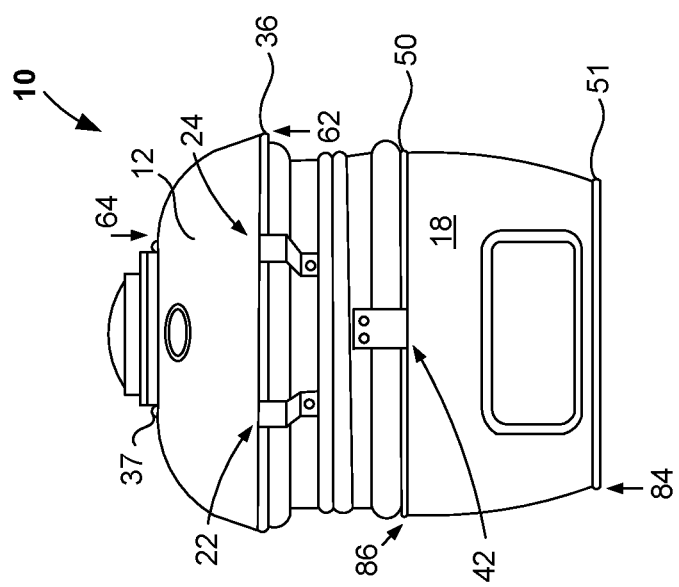

CERAMIC GRILL SHIELD

CLAIM OF PRIORITY

This application claims the benefit of U.S. Provisional Patent Application No. 62/379,837 filed Aug. 26, 2016, which is incorporated herein by reference in its entirety.

FIELD OF THE INVENTION

The present invention relates to a shield for use with grills such as ceramic style grill traditionally exported from Japan (Kamado style) whereby one or more shield portions can assist in reducing the likelihood of burning users or those around such grills.

BACKGROUND OF THE INVENTION

Charcoal and propane grills have been in use for many years taking many different forms and constructions.

Ceramic style grills have been in use for many years. Companies such as the Big Green Egg, Kamado Joe, Premo Grill Dome, Caliber, Black Olive and likely others manufacture Kamado style ceramic grills. The exterior surfaces of these grills can become particularly hot when in use. In fact, some applications of these grills take the temperature up over 700 degrees Fahrenheit if not up to a 1,000 Fahrenheit. While the exterior surface is significantly cooler than the interior, the exterior surface could heat up to a point that unintentional burns could occur when the grills are at highly elevated temperatures or under other conditions if contact were made with the exterior surface.

The applicant is unaware of any attempt to provide a safety device for use with grills, and in particular with Kamado style ceramic grills to reduce a likelihood of contacting hot surfaces.

SUMMARY OF THE INVENTION

Accordingly, is a present object of many embodiments of the present invention to provide a shield for use in spacing a user away from at least some exterior hot surfaces of grills such as the Kamado style grill.

It is another embodiment of the present invention to provide an improved shield for use with grills, such as Kamado style grills to assist in protecting those around the grill, possibly while also providing a display area for displaying colors and/or graphics.

Accordingly, in accordance with a presently preferred embodiment of the present invention, a shield is provided into preferably two portions (or other number of portions) whereby a first portion can cooperate with a top of a grill and a second portion can cooperate with a bottom of the grill. The top is normally hingedly connected to the bottom for many grills.

The shield portions preferably connected to the grill with a spring clip or bracket such as to the metal bands which often proceed along the bottom of the top and the top of the bottom or could be connected to other structures and/or at other locations. The bands are traditionally utilized to connect the springs/hinge at the back of the grill and a handle at a front. Some designs possibly utilize the band to connect to shelf members to the bottom as well.

From the bands, brackets can connect to the shield portions. The brackets can support the shields by an air gap about the shield relative to the top and bottom of the grill respectively. Airflow can proceed between the shield portions and the exterior surfaces of the grill. Accordingly, even if the shield is made of metal, which it is in the preferred embodiment but could be other materials, the shield temperature still does not rise to a significant degree and certainly can be much cooler than an exterior surface of the grill. Preferably, for many embodiments the only direct contact of the shield with the grill is through the brackets. Airflow and/or spacing between the shield and the exterior grill surface has been found to be sufficient to maintain the shield at a non-dangerous temperature even when the grill is cooking at its maximum temperature.

BRIEF DESCRIPTION OF THE DRAWINGS

The particular features and advantages of the invention as well as other objects will become apparent from the following description taken in connection with the accompanying drawings in which:

FIG. 2 is a front plan view of the embodiment of FIG. 1;

FIG. 3 is cross sectional view taken along line A-A FIG. 2;

DETAILED DESCRIPTION OF THE PREFERRED EMBODIMENT

Figure 1:
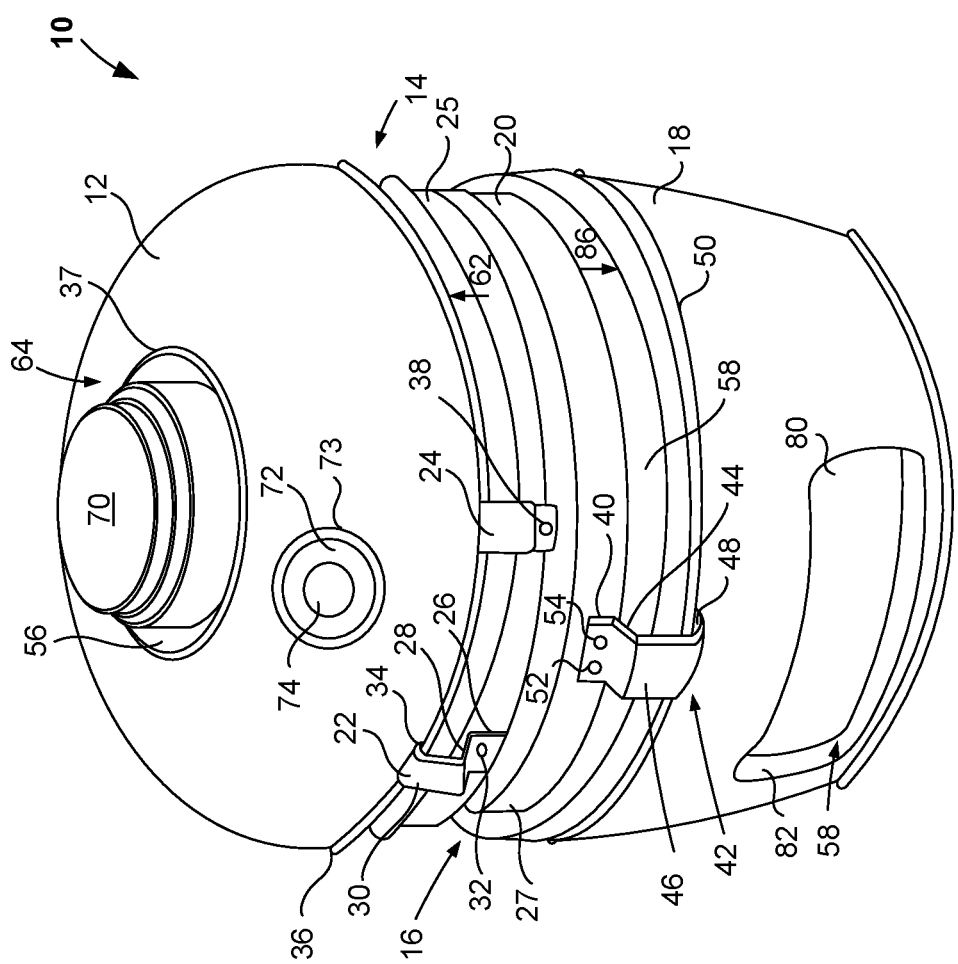
FIG. 1 is a front perspective view of the presently preferred embodiment of the present invention as connected to a Kamado style grill.

FIG. 1 shows a protected grill 10 of a presently preferred embodiment of the present invention. Specifically, an upper shield portion 12 is shown connected to an upper portion or a top 14 of a grill 16 and a bottom shield portion 18 connected to a bottom 20 of the grill 16. The upper shield portion 12 is shown connected by first and second brackets 22,24 which connect to an upper band 25 which normally extends around a bottom portion of the top 14. The brackets 22,24 can be angle brackets such as having a foot 26 spacing a leg 28 from shoulder 30 with the foot 26 having at least one bore 32 therethrough and a shoulder 30 having a curved surface 34 therethrough. The leg 28 can be at right angles relative to foot 26 and/or shoulder 30. Shoulder 30 may be at least approximately parallel to a portion of foot 26. Other angles could be provided for various embodiments. Other connections can be used with other embodiments. Curved surface 34 of shoulder 30 may cooperate with lower lip 36 of upper shield portion (such as be springedly clipped therein, thereby potentially permitting at least relatively easy swapping of one upper shield portion 12 with another).

Lower lip 36 may be an upperwardly rolled (or otherwise formed lip, possibly like a bead, or have other structure). Of course, other connections could be provided between brackets 22,24 and upper shield portion 12 with other embodiments. Upper lip 37 with similar or different constructions could be provided with some embodiments as well.

Kamado grills 16 as shown in FIG. 3 often have a dome-shaped top 14 which is typically connected by a hinge 60 (often with lift assist) to the bottom 20 which is often cylindrically shaped (although often with a wider top than bottom). A firebox opening 82 may permit air flow into the lower grill portion or bottom 20, normally upwardly through a grate (usually ceramic not shown) and through the charcoal to the grill grate (which supports food, not shown) if not around a deflector (not shown) first. The grill grate is located in a cavity 21 and heated air can then flow upwardly past the cooking food out a chimney 68 which often has its air flow rate restricted in an adjustable manner to assist a cook in maintaining a desired temperature inside the grill 16 which can normally be monitored with a thermometer 74 viewable on the top 14. The firebox opening 82 is also normally selectively adjustable to assist in adjusting airflow through the grill 16.

The grills 16 normally have bands 25,27 which extend at bottom edge 29 of top 14 and upper edge 31 of bottom 20. Bottom edge 29 and upper edge 31 meet together to enclose the cavity 21 therein in a closed configuration of the grill 16 and separate when in an open configuration.

Connectors such as bolts 38 and others can assist in connecting the brackets 22,24 and/or others to the upper band 25 if not to upper shield portion 12 as well or other appropriate structure. Certainly other bands or other connection systems could be provided whether they connect as the upper band 25 provided with most grills 16 or otherwise. Certainly grills could be manufactured to accept an upper shield portion 12 without a need to retrofittedly connect to the upper band 25 and/or connect in other ways. Lower band 27 could also be the one provided by the manufacturer or others and/or provide an ability for a foot 40 of the bracket 42 to be connected through leg 44 to shoulder 46. Shoulder 46 may have a curved portion 48 to receive an upper lip 50 of bottom shield portion 18 illustrated or connections could be provided with other embodiments. Upper and lower lips 50,51 of bottom shield portion 18 may be similar or dissimilar in construction as lips 36,37 of upper shield portion 12.

The foot 40 may have at least one connector 50 extending through at least one bore 54 so as to connect with the bracket 42 respectively to the bottom grill portion 20 such as at the lower band 27 and/or other appropriate location. The shield portions 12,18 preferably provide a gap such as air gaps 56,58 shown in FIG. 1 as better reference to FIG. 3.

Foot 40 may be substantially parallel to at least a portion of shoulder 46. Leg 42 may be perpendicular to foot 40 and/or at least a portion of shoulder 46. Other angular relationships may be provided with other embodiments.

Figure 4:
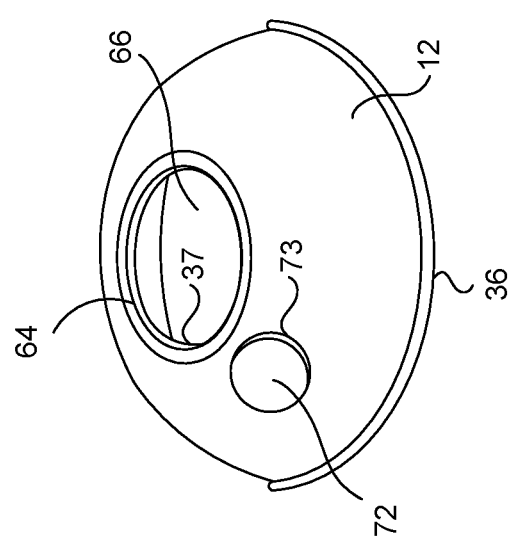
FIG. 4 is a top perspective view of the top shield portion removed from the cooker shown in FIGS. 1-3.

As can be seen in reference to FIGS. 2 and 3, the top shield portion 12 and bottom shield portion 18 can be spaced by air gaps 56,58 from the upper grill portion 14 and lower grill portion 20, respectively, utilizing the brackets 22,24,42 and/or others. There is often a handle extending between the connectors 32,38 so as to assist in opening the upper grill portion 14 relative to the lower grill portion 20 which are usually connected by a hinge 60. Upper grill portion may extend from a bottom 62 to a top 64 possibly having a first bore 66 for receiving the chimney 68 normally provided with adjustable airflow cap 70 (to assist in adjusting the temperature of the grill 16). A second bore 72 possibly surrounded with a gasket 73 is often provided for access to be able to use a thermometer 74 normally provided with these style grills, often to assist a user in maintaining a desired temperature inside the grills 16. Accordingly, if utilized, the second bore 72 preferably provides viewing access to the thermometer 74 and the first bore 66 shown in FIG. 4 can provide an ability for the chimney 68 and cover or airflow cap 70 to perform their normal functions.

Air gap 56 can preferably be maintained from at least toward the bottom 62 to toward the top 64 of the upper shield portion 12 while providing these various access and operational capabilities. Air gap 58 may be a constant width or may vary at specific locations in width. Air gap 56 also preferably proceeds circumferentially about an exterior surface 76 of the top 14. The upper shield portion 12 may be made of any suitable material. The applicant is contemplating manufacturing the upper shield portion 12 as well as the lower shield portion 18 of metal such as metal which has been through a spinning process to a desired thickness such as around 50 mil or about $\frac{1}{16}^{th}$ of an inch thick. Other manufacturing techniques could be employed with other embodiments. By providing a metal, such as aluminum, steel or other metal, the metal could be powder coated to a desired color such as one of a variety of colors, hydro dipped (or otherwise adorned) and/or provided with various indicia thereon such as sports teams indicia, logos of businesses or other indicia on the exterior surface 76 thereof. High heat resistant plastics or other materials may be used with other embodiments and the spacing of the gap 56,58 may be different for various embodiments.

A similar manufacturing process and treatment can be had for the exterior surface 78 of the lower shield portion 18 if provided to assist in providing air gap 58 in a similar manner as described above for the air gap 56 with upper shield portion 16. Many of these type grills 16 sit in various tables or stands and it may be possible if only the upper portion 12 be provided for some embodiments. For other embodiments, someone may only want the lower portion 18 or both upper and lower shield portions 12,18. Lower shield portion 18 preferably provides at least a cutout 80 for use in accessing the firebox opening 82 which is normally utilized selectively opened or shut (a varying amount) by user to assist in regulating the temperature inside the grill 16 as would be understood by those of ordinary skill in the art.

Figure 5:
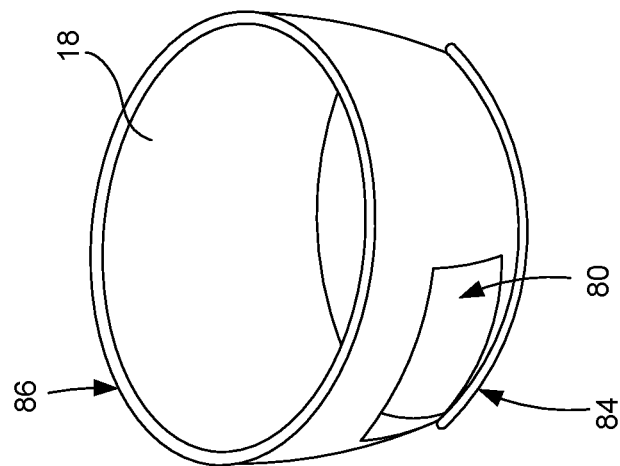
FIG. 5 is a top perspective view of the bottom shield portion removed from the cooker shown in FIGS. 1-3.

The lower shield portion 18 can have a bottom 84 and a top 86 as shown in FIGS. 3 and 5 so the airflow and/or air spacing can proceed through the gap 58 from the bottom 84 to the top 86 (as well as circumferentially around the bottom 20 of the grill 16) in a desired manner. Once again, the color can be any color selected as well as manufacturing materials and/or other affects. Due to the air gaps 56,58 which could be about ½ inch, ¾ inch to an inch or more (and could be constant or vary at specific locations), the upper and lower shield portions 12 and 18 are not expected to be significantly elevated in temperature relative to ambient due to the airflow.

For many embodiments, the upper and lower shield portions 12,18 do not contact the exterior surfaces of the grill 16, instead only the bracket such as illustrated brackets 22,24,42 make such contact. This allows the air gaps 56,58 to be maintained (at least to some degree if not constant) for the preferred embodiments. Other embodiments may allow contact at various portions and/or utilize various insulation techniques to assist in reducing the temperatures of the exterior surfaces 76,78 of the upper and lower shield portions 12,18.

For the preferred embodiment note that the first bore 66 of the upper shield portion 12 preferably does not contact either of the chimney 68 or the cover 70 in the preferred construction so the airflow can be directed up and around the chimney 68 as well as the cap 70. The air gaps 56,58 may begin toward the bottoms of the top 14 and bottom 20 and extend toward upper portions thereof.

One will quickly see that one could take the protected grill 10 to events such as tailgates and/or for various other events such as high school football games, picnics, or other appropriate sporting events with team colors and/or other logos displayed. Furthermore, advertisers may benefit from providing shield portions 12,18 for various giveaways, promotions, and/or branding opportunities.

Kamado grill manufacturers may benefit by being able to provide additional accessories to their customers from a safety perspective while also providing the coloration of their brands. Of course, various indicia could be displayed on the upper and lower shield portions 12,18 as would be desired by users and various manufacturers.

With the connection systems shown, connectors such as 34 and 50 on shoulder 46 could be removed relatively easily so that the top and the bottom shield portions 12,18 could be removed and different ones replaced therewith such as if one is transitioning between a child's high school team event to a corporate event or other change as might be desired for various users.

Although the shield portions 12,18 are believed to assist in protecting a user, if one is committing to contacting any portion of the grill 16 it is certainly possible or even likely for someone to continue to burn themselves without exercising due care.

Preferred embodiments of the upper and lower shield portions 12,18 provide little if any insulating effect to the Kamado style ceramic grill. Instead this shield portions 12,18 assist in spacing a user from potentially hot exterior surfaces portions of the top 14 and/or bottom 20 as appropriate.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A grill shield for use with a grill having a top connected to a bottom with an open and a closed configuration with the top located on the bottom in the closed configuration and displaced therefrom in the open configuration permitting access into a cavity therewithin, said grill shield comprising:
   an upper shield portion secured to the top of the grill, said upper shield having an air gap proceeding from a bottom to a top of the upper shield portion between an exterior surface the grill and the upper shield portion from toward a bottom of the top to toward an upper portion of the top, and the upper shield portion is spaced apart from the grill at the bottom and top of the shield by the air gap whereby airflow proceeds from external to the grill and shield upwardly through the air gap and then exits at the top of the upper shield external to the grill to assist in reducing a temperature of the upper shield.

2. The grill shield of claim 1 wherein the upper shield portion is spaced from the chimney by a gap.

3. The grill shield of claim 1 wherein the air gap extends circumferentially about the upper shield portion from at least about at the bottom of the upper shield portion to at least about at the top of the upper shield portion.

4. The grill shield of claim 1 wherein the air gap is at least one half inch.

5. The grill shield of claim 4 wherein the bottom shield portion is secured to the bottom of the grill with brackets.

6. The grill shield of claim 1 wherein the only physical contact of the upper shield portion with the top of the grill is through the brackets.

7. The grill shield of claim 1 further comprising a bottom shield portion connected to the bottom of the grill, said bottom shield portion secured to the bottom of the grill, said bottom shield having an air gap proceeding from a bottom to a top of the bottom shield portion between an exterior surface the grill and the bottom shield portion, and the bottom shield portion is spaced apart from the grill at the bottom and top of the shield by the air gap whereby airflow proceeds from external to the grill and shield upwardly through the air gap and then exits at the top of the bottom shield external to the grill to assist in reducing a temperature of the bottom shield.

8. The grill shield of claim 7 wherein the brackets have a foot spaced by a leg from a shoulder, with the foot connected to the bottom shield portion and the shoulder connects to the bottom of the grill.

9. The grill shield of claim 7 wherein a foot connects to an upper lip of the bottom shield portion.

10. The grill shield of claim 7 wherein the air gap extends circumferentially about the bottom shield portion from at least about at the bottom of the bottom shield portion to at least about at the top of the bottom shield portion.

11. The grill shield of claim 7 wherein the grill has a firebox and the bottom shield portion has at least a cutout providing access to the firebox opening in the bottom of the grill.

12. The grill shield of claim 7 wherein the upper shield portion and the bottom shield portion are spaced from one another when the grill is in the closed configuration.

13. The grill shield of claim 7 wherein the air gap is at least one half inch.

14. The grill shield of claim 7 wherein the only physical contact of the bottom shield portion with the bottom of the grill is through the brackets.

15. The grill shield of claim 1 in combination with a Kamado grill.

16. A grill shield for use with a grill having a top connected to a bottom with an open and a closed configuration with the top located on the bottom in the closed configuration and displaced therefrom in the open configuration permitting access into a cavity therewithin, said grill shield comprising:
   an upper shield portion secured to the top of the grill, said upper shield having an air gap proceeding from a bottom to a top of the upper shield portion between an exterior surface the grill and the upper shield portion from toward a bottom of the top to toward an upper portion of the top;
   wherein the upper shield portion is secured to the top of the grill with brackets; and wherein the brackets have a foot spaced by a leg from a shoulder, with the foot connected to the upper shield portion and the shoulder connects to the top of the grill.

17. The grill shield of claim 16 wherein the foot connects to a lower lip of the upper shield portion.

18. The grill shield of claim 16 wherein the shoulder connects to an upper band circumnavigating the top of the grill at a bottom edge of the top of the grill.

19. A grill shield for use with a grill having a top connected to a bottom with an open and a closed configuration with the top located on the bottom in the closed configuration and displaced therefrom in the open configuration permitting access into a cavity therewithin, said grill shield comprising:
   an upper shield portion secured to the top of the grill, said upper shield having an air gap proceeding from a bottom to a top of the upper shield portion between an exterior surface the grill and the upper shield portion from toward a bottom of the top to toward an upper portion of the top;

a bottom shield portion connected to the bottom of the grill, said bottom shield portion secured to the bottom of the grill, said bottom shield having an air gap proceeding from a bottom to a top of the bottom shield portion between an exterior surface the grill and the bottom shield portion;

wherein the bottom shield portion is secured to the bottom of the grill with brackets; wherein the brackets have a foot spaced by a leg from a shoulder, with the foot connected to the bottom shield portion and the shoulder connects to the bottom of the grill;

and a bottom band extending about an upper rim of the bottom of the grill, and said bottom shield portion is connected to the bottom band with the shoulders of the brackets.

\* \* \* \* \*